L. F. HESS.
CUTTER HEAD.
APPLICATION FILED SEPT. 20, 1911.
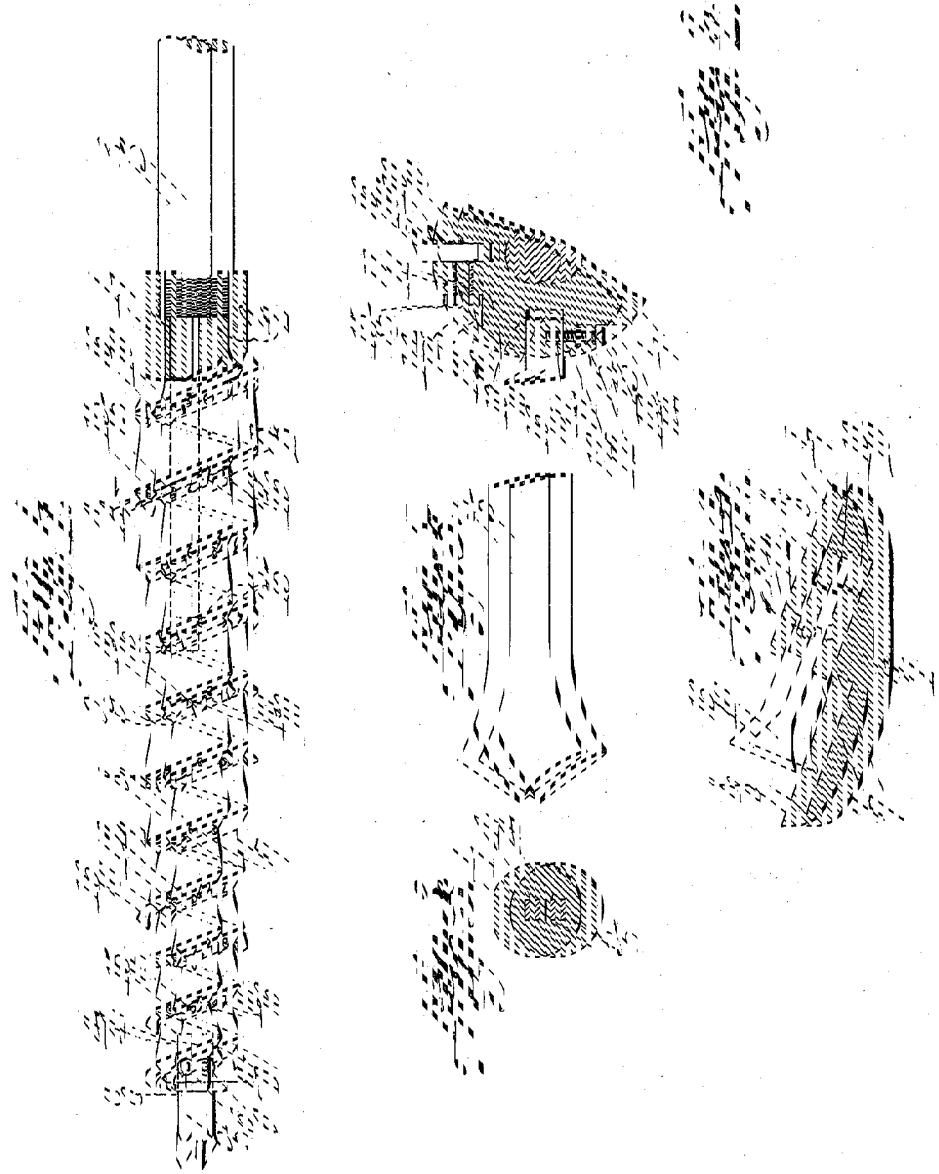

UNITED STATES PATENT OFFICE.

LOUIS F. HESS, OF ANSTED, WEST VIRGINIA.

CUTTER-HEAD.

1,019,251.  Specification of Letters Patent.  Patented Mar. 5, 1912.

Application filed September 20, 1911. Serial No. 650,438.

*To all whom it may concern:*

Be it known that I, LOUIS F. HESS, a citizen of the United States, residing at Ansted, in the county of Fayette and State of West Virginia, have invented a new and useful Cutter-Head, of which the following is a specification.

The objects of the present invention are, to provide a cutter head for a mining machine, having a spiral rib so constructed that the head will be thoroughly efficient in retracting the dust, a packing of the dust against the rib being avoided.

A further object of the invention is to provide a cutter head for a mining machine, having a spiral rib so constructed that it will serve as an unusually strong element in which the cutters may be mounted.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 shows in side elevation, a cutter head constructed in accordance with the present invention, parts being broken away; Fig. 2 is a transverse fragmental section upon the line A—B of Fig. 1; Fig. 3 is a transverse section upon the line C—D of Fig. 1; Fig. 4 is a fragmental longitudinal section of the cutter head; and Fig. 5 is a fragmental side elevation of the cutter which is mounted in the forward end of the head.

In carrying out the invention there is provided as a primary and fundamental element, a cutter head denoted generally by the numeral 1. The cutter head 1 tapers from its rear end toward its forward end, as clearly shown in Fig. 1. In the rear end of the head 1 there is an axial bore 2, adapted to receive the shank 3 of the driving element, the shank 3 being held in place in the head 1 by threading, or in any other satisfactory manner. In the forward end of the head 1 there is an axial bore 4, adapted to receive a bit 5, preferably a pointed tool, the cutting end of which is turned slightly in the direction of rotation of the head 1. The bit 5 may be held in place in the head 1 by means of a set screw 6, threaded into the head 1, and adapted to engage the bit 5.

The head 1 is circumscribed by a spiral rib. The front face 7 and the rear face 8 of the convolutions of this rib slope in opposite directions, longitudinally of the head, as Fig. 1 will clearly show. The angle between the front face 7 and the axis of the head 1 is greater than the angle between the rear face 8 and the axis of the head 1. The front face 7 of one convolution of the spiral rib intersects the rear face 8 of the next adjacent convolution, as shown at 9. At this point 9, the faces 7 and 8 meet at an obtuse angle. The front face 7 of the spiral rib is pierced by a series of tool-receiving seats 10. Noting Fig. 2 it will be observed that each seat 10 is located in a radial plane passing through the longitudinal axis of the cutter head 1. Referring to Fig. 4, however, it will be noted that the seats 10 are disposed at an acute angle to the axis of the cutter head 1. The front face 7 of the spiral rib is pierced by tangential openings 11, the openings 11 communicating with the socket 10. Into the openings 11, set screws 12 are threaded, the outer ends of the openings 11 being enlarged, as shown at 14, to receive the heads 15 of the screws 12. The sockets 10 are adapted to receive the cutters 16, the cutters being retained in the head 1 by the screws 12, as will be readily understood from an inspection of Fig. 2. The cutters 16 may be of any form. In the present instance they are shown as of angular configuration.

Owing to the fact that the faces 7 and 8 slope in opposite directions, and owing to the fact that the face 7 of one convolution intersects the face 8 at an obtuse angle, the dust cannot become packed at the point 9.
The dust cannot become packed against the convolutions of the spiral rib, as is the case when the spiral rib is fashioned with two parallel faces disposed at right angles to the axis of the head. Although the faces 7 and 8 meet at an obtuse angle as shown at 9, the spiral rib withal will be effective to keep in motion, and to retract, the dust, so that the cutter head will clear itself.

Since the front face 7 is rearwardly inclined with respect to the axis of the head, and since the socket 10 enters the face 7, a mass of solid material lies between the tool 16 and the axis of the head, the mounting of the tool being rendered thereby secure, and the danger of the tool breaking out of the socket being reduced to a minimum. The rib is therefore of far greater strength, considered as a tool-receiving element, than is a rib the front and rear faces of which are parallel and disposed at right angles to the axis of the head. The mounting of the tool is made more secure, further, by reason of the fact that each socket 10 is located in a common plane with the axis of the head 1, but at an acute angle to the axis. Obviously, noting Fig. 2, since the sockets 10 are disposed in a radial plane passing through the longitudinal axis of the head 1, a maximum amount of material lies between the bases of the sockets and the axis of the head 1. Since the sockets 10 are inclined at an acute angle to the axis, however, the sockets may be made deeper than would be possible if the sockets entered the spiral rib at right angles to the axis of the head.

In conclusion it may be stated that a cutter head constructed in accordance with the present invention will clear itself readily, all packing of the dust against the rib being avoided; and the tools will be retained securely in the rib, owing to its peculiar construction, and owing to the manner in which the tools are inserted thereinto. One of the marked improvements effected by this cutter head is that it will retract the dust without agitating the dust and causing it to be suspended in the air of the mine. When a cutter head having a flange which outstands at a right angle to the axis of the head, is rotated at a high speed, the dust is retracted with unnecessary speed, and is thrown rearwardly in violence, which causes the finer and more dangerous particles of the dust to be suspended in the air of the mine. It has been found in practical operation that the cutter head herein disclosed, may be rotated at a high rate of speed without agitating the dust unduly, and without whirling it tangentially away from the cutter, to mingle with the air of the mine.

Having thus described the invention, what is claimed is:—

1. A cutter head for a mining machine, having a spiral rib, the front and rear faces of the convolutions of which slope in opposite directions longitudinally of the head; and a cutter carried by the front face of the rib.

2. A cutter head for a mining machine, having a spiral rib, the front and rear faces of the convolutions of which slope in opposite directions longitudinally of the head, the angle between the front face and the axis of the head being greater than the angle between the rear face and the axis of the head; and a cutter carried by the front face of the rib.

3. A cutter head for a mining machine, having a spiral rib, the front and rear faces of the convolutions of which slope in opposite directions, longitudinally of the head, the front face of one convolution intersecting the rear face of the next adjacent convolution; and a cutter carried by the front face of the rib.

4. A cutter head having a spiral rib, the front and rear faces of the convolutions of which slope in opposite directions longitudinally of the head, the angle between the front face and the axis of the head being greater than the angle between the rear face and the axis of the head, the front face of one convolution intersecting the rear face of the next adjacent convolution; and a cutter carried by the front face of the rib.

5. A cutter head for a mining machine, having a spiral rib, the front and rear faces of the convolutions of which slope in opposite directions longitudinally of the head; the front face being pierced by a socket located in a radial plane passing through the longitudinal axis of the head and disposed at an acute angle to said axis.

6. A cutter head for a mining machine, having a spiral rib the front and rear faces of the convolutions of which slope in opposite directions longitudinally of the head, the angle between the front face and the axis of the head being greater than the angle between the rear face and the axis of the head, the front face of one convolution intersecting the rear face of the next adjacent convolution; there being tool-receiving sockets piercing the front face of the rib, each of which sockets is located in a radial plane passing through the longitudinal axis of the head, and disposed at an acute angle to said axis.

In testimony that I claim the foregoing as my own, I have hereto affixed my signature in the presence of two witnesses.

LOUIS F. HESS.

Witnesses:
C. G. TAYLOR,
J. H. CORT.